United States Patent [19]

Ryzin et al.

[11] Patent Number: 4,662,904
[45] Date of Patent: May 5, 1987

[54] GILL FOR EXTRACTING OXYGEN FROM OXYGEN BEARING FLUIDS

[75] Inventors: Joseph V. Ryzin, Kailua; Jose M. Andres, Honolulu; Dale Jensen, Honolulu; Robert Ruggieri, Honolulu, all of Hi.

[73] Assignee: Aquanautics Corporation, Beaufort, N.C.

[21] Appl. No.: 753,529

[22] Filed: Jul. 10, 1985

[51] Int. Cl.[4] .............................................. B01D 53/22
[52] U.S. Cl. ........................................ 55/158; 55/159; 55/356; 114/334
[58] Field of Search .................. 55/16, 158, 159, 356, 55/400; 114/67 R, 67 A, 334

[56] References Cited

U.S. PATENT DOCUMENTS

| | | | |
|---|---|---|---|
| 1,097,356 | 5/1914 | Parnitzky | 114/334 |
| 1,376,178 | 4/1921 | Wagenseil | 165/44 X |
| 1,412,073 | 4/1922 | Wagenseil | 165/44 X |
| 1,822,659 | 9/1931 | Kirsch | 114/334 X |
| 2,158,858 | 5/1939 | Hoffmann | 165/112 |
| 2,434,453 | 1/1948 | Beeman | 114/334 |
| 3,016,865 | 1/1962 | Eichenberger | 114/67 A |
| 3,075,489 | 1/1963 | Eichenberger | 114/67 A |
| 3,228,394 | 1/1966 | Ayres | 55/16 X |
| 3,333,583 | 8/1967 | Bodell | 128/200.2 S |
| 3,369,343 | 2/1968 | Robb | 55/16 |
| 3,616,601 | 11/1971 | Senkewich | 114/334 X |
| 3,690,040 | 9/1972 | Halfon | 55/68 X |
| 3,722,179 | 3/1973 | Maen et al. | 55/68 X |
| 3,910,780 | 10/1975 | Henley et al. | 55/68 X |
| 3,911,080 | 10/1975 | Mehl et al. | 55/158 X |
| 3,930,814 | 1/1976 | Gessner | 55/16 |
| 3,976,451 | 8/1976 | Blackmer et al. | 55/158 |
| 3,979,190 | 9/1976 | Hedman | 55/158 |
| 4,174,955 | 11/1979 | Blackmer et al. | 55/158 |
| 4,239,729 | 12/1980 | Hasegawa et al. | 422/48 |
| 4,268,279 | 5/1981 | Shindo et al. | 422/48 X |
| 4,343,715 | 8/1982 | Bonaventura et al. | 55/68 X |
| 4,451,270 | 5/1984 | Roman | 55/68 X |
| 4,537,606 | 8/1985 | Itoh et al. | 55/158 |
| 4,542,010 | 9/1985 | Roman et al. | 55/158 X |
| 4,553,988 | 11/1985 | Shimizu et al. | 55/158 |

Primary Examiner—Robert Spitzer
Attorney, Agent, or Firm—Oblon, Fisher, Spivak, McClelland & Maier

[57] ABSTRACT

An apparatus for extracting oxygen from sea water in which a plurality of hollow gill members carry on oxygen extracting heme and are positioned within a diffuser. A flow of oxygen bearing liquid, such as sea water, passes through the diffuser and around the gill membranes. The gill membranes are angled with respect to the flow of sea water. The diffuser has a reduced section intake and outlet, and is divided into a number of channels, with the result that the drag force is reduced while maintaining adequate oxygen extraction. Propellers compensate for drag force losses.

9 Claims, 6 Drawing Figures

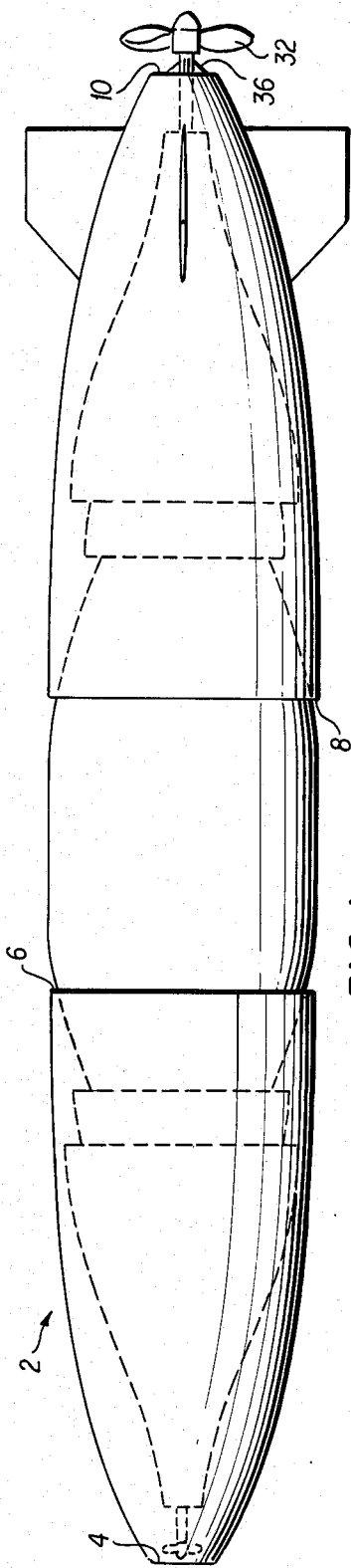
FIG. 1
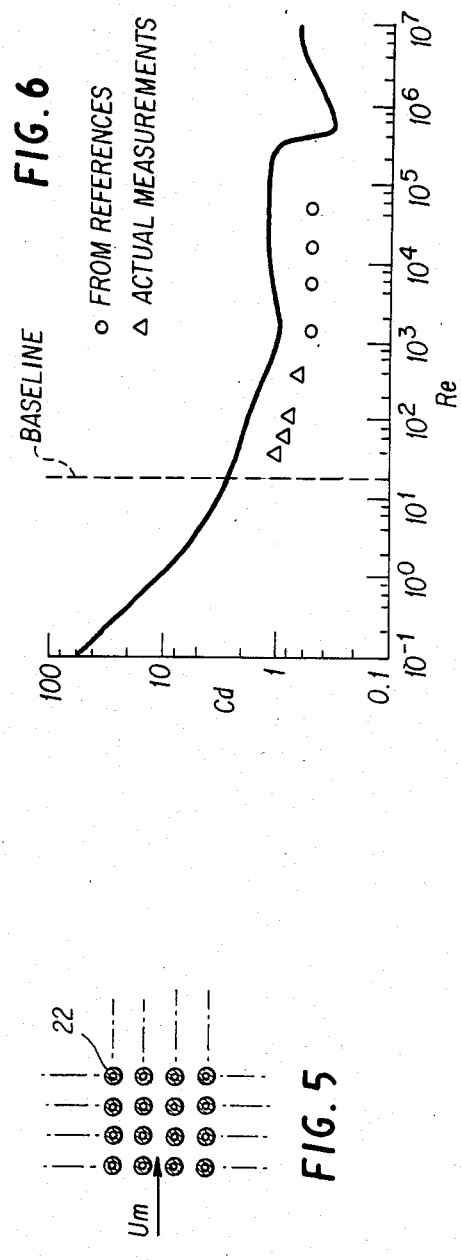
FIG. 6
FIG. 5

GILL FOR EXTRACTING OXYGEN FROM OXYGEN BEARING FLUIDS

BACKGROUND OF THE INVENTION

1. Field of the Invention

This invention relates to a gill structure for extracting oxygen from fluids in which oxygen is dissolved.

2. Description of Related Art

Copending U.S. patent application Serial No. 653,850, filed on Sept. 24, 1984, now U.S. Pat. No. 4,602,987 and assigned to the same assignee as the present application, discloses a system and process for the extraction of oxygen from fluids in which oxygen is dissolved. This copending application is hereby incorporated by reference. The copending application discloses a process in which oxygen is extracted from an oxygen bearing fluid by contacting the oxygen bearing fluid with a gill structure including a first surface of an oxygen permeable membrane, which can be in the form of a tube. A series of such tubes contain a carrier fluid having a binding-state oxygen carrier, called a heme, as a result of which oxygen which diffuses through membrane binds to the heme. The oxygen carrying carrier fluid is caused to flow to an electrode compartment of an electrochemical cell at which point the heme is electrochemically modified to release oxygen which can be removed for further use. The carrier fluid and heme can then be recirculated to the membranes.

Such extracted oxygen is useful in a variety of environments. For example, it may be used in a gasoline-spark ignition engine of an underwater vehicle to propel the vehicle through the water. An example of such a vehicle is schemically illustrated in FIG. 11 of said copending U.S. patent application Ser. No. 653,850. FIG. 11 of said copending application illustrates a 10 kilowatt engine driving a pair of gear driven thrusters and deriving power from a liquid fuel in a flexible bag, as well as oxygen extracted from a pair of gill structures which are schematically shown.

In the design of submerged vessels, minimizing drag is critical for the efficient operation of the vehicle. It is therefore desirable to minimize both the size of the gill structure and the amount of drag on the gill structure. However, the gill structure must also be designed for maximum oxygen extraction efficiency in order that sufficient oxygen can be supplied to the engine with a minimum sized gill structure. These are conflicting constraints.

SUMMARY OF THE INVENTION

It is accordingly an object of the present invention to provide a gill structure for a device immersed in a relatively moving stream of oxygen bearing fluid, said gill structure having minimum drag while maintaining adequate oxygen extraction characteristics.

According to the present invention, the above and other objects are accomplished in part by angling hollow cylindrical gas permeable membranes of the gill structure by a predetermined angle relative to the direction of flow past the membranes of oxygen bearing fluid such as, but not limited to, sea water. The structure for achieving this object includes a plurality of membranes arranged at an angle to the direction of flow of sea water and positioned within a diffuser. The diffuser has a restricted inlet and a restricted outlet so that the flow velocity of the sea water within the diffuser will be less than that of the underwater vessel. The reduced flow velocity reduces the drag induced by the gill structure and increases the residence time of the sea water at the membranes.

The restrictions at the inlet and outlet of the diffuser will result in hydrodynamic resistance and a corresponding pressure drop thereacross. The present invention therefore provides a propelling means such as a propeller at the diffuser inlet or outlet which compensates for the hydrodynamic resistance of the membranes and other diffuser losses.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein:

FIG. 1 is an elevational view of an underwater vehicle which can use the gill structure of the present invention;

FIG. 5 is a schematic illustration of a section of a gill structure; and

FIG. 6 is a graph of the hydrodynamic drag on the gill fibers as a function of Reynolds number.

DETAILED DESCRIPTION OF THE PREFERRED EMBODIMENT

Figure 2:
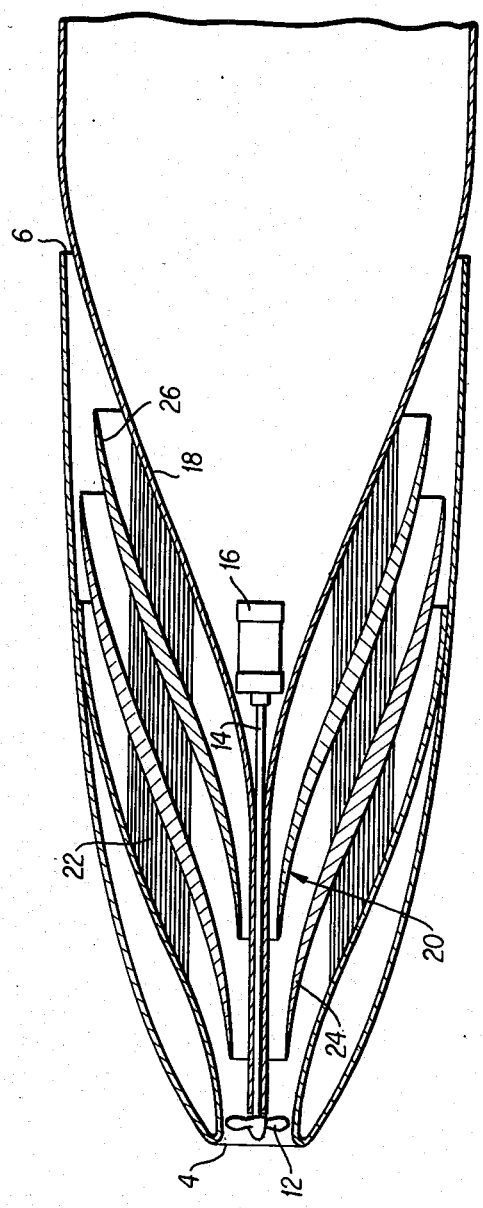
FIG. 2 is the front half of the vehicle of FIG. 1, seen in section.

A preferred embodiment of the present invention will be described with reference to the attached figures, using the same reference numerals for the same or corresponding parts throughout the several views.

FIG. 1 illustrates an underwater vehicle having a propulsion system which can use the oxygen extraction gill structure of the present invention for producing oxygen, at least some of which oxygen can be used in the vehicle propulsion system. The vehicle 2 has an annular bow gill inlet 4, an annular bow outlet 6, an annular stern gill inlet 8, and an annular stern outlet 10.

FIG. 2 is a section of the bow gill structure. Within the intake 4, a propeller 12 has a hydrodynamic bullet shaped head mounted on a shaft 14 which defines the intake 4 as an annular area around the propeller head. The propeller shaft 14 is driven by a motor 16 which can be an electric motor supplied with energy by a generator driven by the main vehicle engine, or can be a small auxiliary ignition spark engine. An annular fairing 18 surrounds the shaft and forms a radially inner surface of the diffuser 20 containing and supporting the gill membranes 22. The diffuser is divided into a number of concentric channels by a series of concentric annular hydrodynamic fairings 24 and 26. This reduces the lengths of the gill diaphragms in each channel and further reduces the velocity of the water as it crosses the gill diaphragms.

Figure 3:
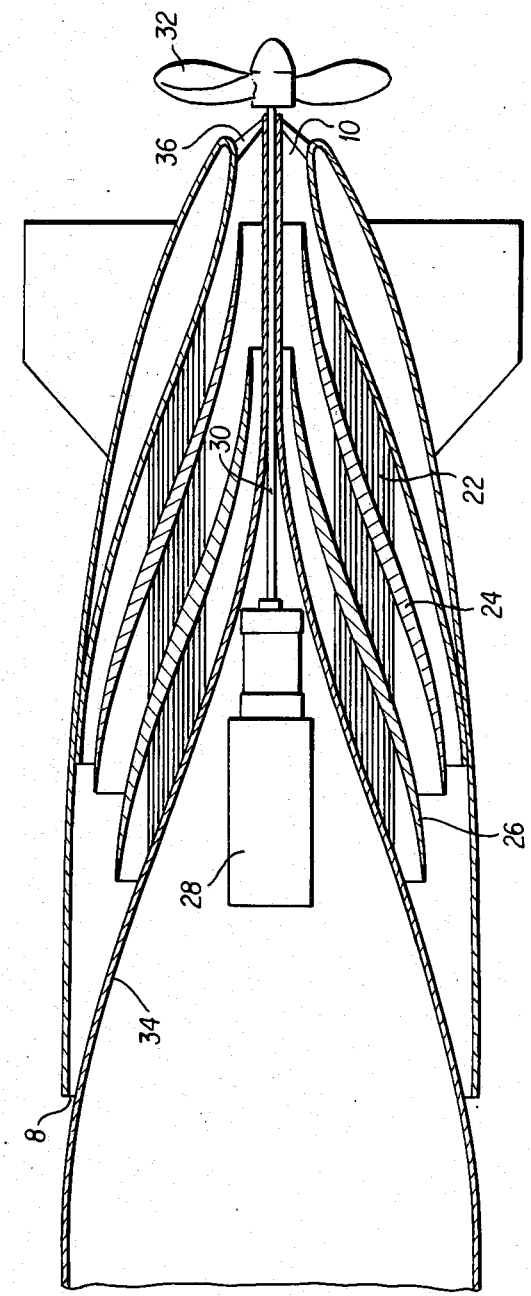
FIG. 3 is the back half of the vehicle of FIG. 1, seen in section.

FIG. 3 illustrates the stern gill. The stern gill also contains gill membranes 22 within concentric annular channels defined by annular hydrodynamically shaped fairings 24 and 26. However, the shapes of the gill inlet and outlet and fairings are reversed as compared to the bow gill. The inlet 8 is annular and lacks a propeller. A main vehicle motor and controller 28, which may include a spark ignition internal combustion engine which consumes a portion of the oxygen produced by the gill structure, drives a drive shaft 30 and main vehicle propeller 32. The shaft 30 is surrounded by an annular fairing 34, and is supported at the outlet 10 by a spyder 36. The motor and controller may be a well known internal combustion engine and controller therefor, and will not be described in detail.

Figure 4:
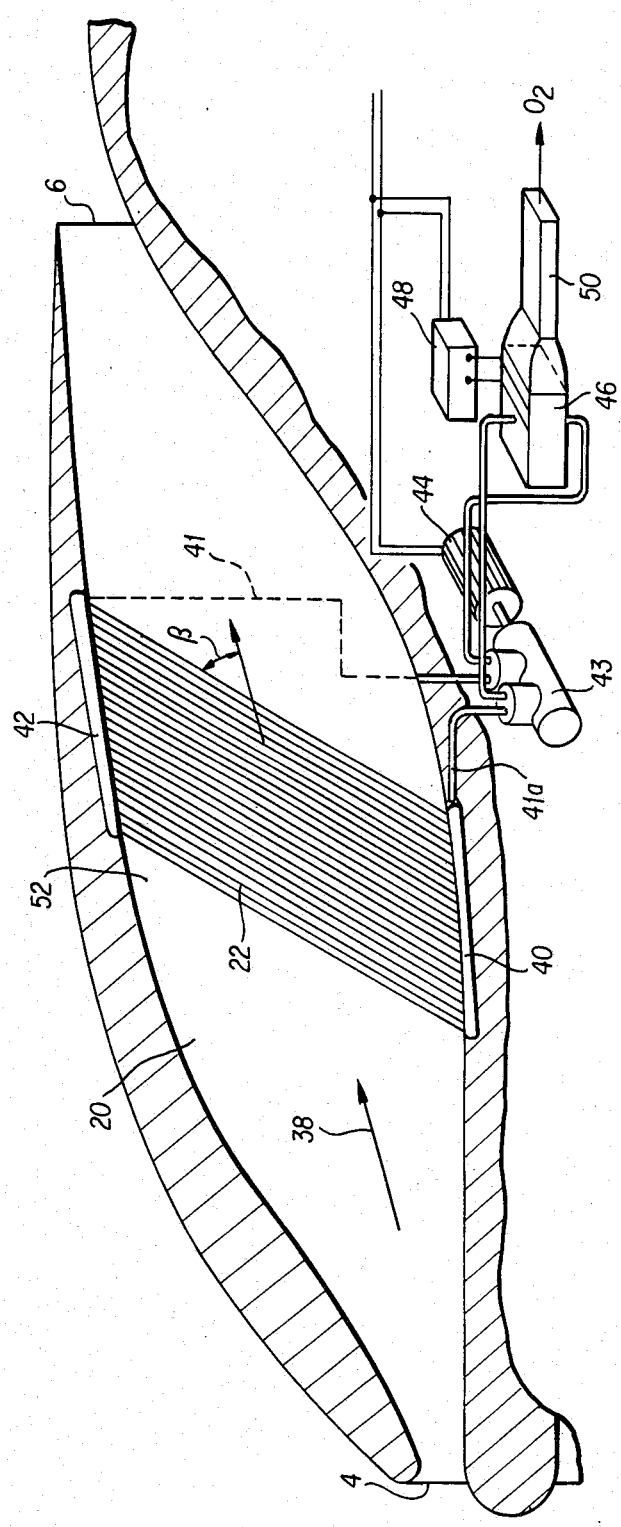
FIG. 4 is a schematic detail illustrating a gill and heme treating system.

The gill structure and heme supplying and circulating structure are schematically shown in FIG. 4, which only shows a single flow channel, and does not illustrate the propeller 12, for the sake of simplicity. The gill membranes 22 each consist of a hollow cylindrical tube formed of a gas permeable material such as silicone rubber, polytetrafluoroethylene, an alkylcellulose or an acetylcellulose. The gills are arranged in an annular array of non-staggered rows as shown schematically in section in FIG. 5. The gills all extend radially and are arranged at a uniform angle $\beta$ with respect to the direction of flow 38 of the water from the intake.

Each end of each gill diaphragm is secured to an annular manifold 40 or 42 in a fluid tight manner, as by bonding using a waterproof resin. Heme or another compound having similar oxygen absorbing and desorbing properties is circulated via lines 41a and 41b through the manifolds and gills by a pump 43, which is preferably a double piston pump for purposes of balance. The pump is driven by an electric motor 44, which may be supplied with electrical power from a generator driven by the motor 28. The heme, which has extracted oxygen from the water passing through the diffuser 20, is pumped to an unloading chamber 46 having a power supply 48 and including a membrane 50, where the oxygen is extracted from the heme, by a process described in detail in the aforementioned copending U.S. patent application Ser. No. 653,850, now U.S. Pat. No. 4,602,987. The oxygen can then be used for various purposes, including for mixing with fuel for the motor 28. The heme, which has had oxygen unloaded therefrom, is then pumped back to the gill structure via line 41a or 41b.

As is clear from FIG. 4, the diffuser 20 has a relatively small area intake 10, and smoothly and progressively increases in size to a diaphragm supporting region 52 at which the gills are positioned. The diffuser section is then smoothly and progressively reduced towards the outlet 6. The effect of this is that the water velocity is reduced at the gills, with corresponding reduced frictional and pressure drag. Moreover, the water has an increased residence time at the gills, due to its reduced velocity, and a corresponding increase in extraction efficiency.

The angling of the gills by an angle $\beta$ with respect to the water flow direction 38 also reduces the drag force attributable to the membranes according to the formula:

$$F = C_D P/2 \, A_t |U_m| U_m (\sin \beta)^{1.5}$$

where
F = Hydrodynamic drag force
$C_D$ = drag coefficient
P = density of water
$A_t$ = frontal area of all fibers
$U_m$ = water velocity
$\beta$ = angle of fibers The drag coeffecent $C_D$ can be found from FIG. 6 which is a graphical representation of the drag coefficient for circular cylinder membrane bundles as a function of the Reynolds number, which is in turn is a function of the water velocity $U_m$. The base line refers to the minimum Reynolds number tested for. The solid line in the graph illustrates values of $C_D$ for a single circular cylinder, the triangles represent actually measured values and the circles represent values derived from Grimson, E. D. "Correlation and Utilization of New Data on Flow Resistance and Heat Transfer for Cross Flow of Gases over Tube Banks," Trans, ASME 59, 583-594 (1937).

Accordingly, it can be appreciated that the gill structure reduces drag force attributable thereto in at least two ways. First, the relatively small diffuser intake area and outlet area result in a substantial reduction in the water velocity past the gill membranes. The resulting lowered Reynolds number results in a reduced value for the drag force which is proportional to the square of the fluid velocity.

A smaller angle $\beta$ also produces reduced drag. However, as the angle $\beta$ becomes smaller, the rate of oxygen extraction through the gill membranes is reduced since the gills present a smaller frontal area to the flow of oxygen bearing water. Increasing the number of gills will increase the rate of extraction, but will also increase the drag force. It has been found that an angle $\beta = 25°$ provides an optimum balance between these conflicting constraints of reducing drag while maintaining adequate oxygen extraction.

The propeller 12 within the bow gill replaces the energy lost due to drag force in the diffuser. The main propeller 32 provides a similar function for the stern gill structure. The power $P_{prop}$ supplied by the motor to each of the propellers 12 and 32 is based on the following equation $$P_{prop} = \eta_{prop}(P_{dif} + P_{drag})$$

where $\eta$ = propellor efficiency
$P_{dif}$ = power losses in diffuser, including inlet and outlet losses.
$P_{drag}$ = power losses due to drag on gill fibers.

Appropriate hydrodynamically shaped spiders may be provided for securing the various fairings to one another. These spiders may support or contain fluid lines which cross the diffuser, such as the line 41.

Obviously, numerous modifications and variations of the present invention are possible in light of the above teachings. It is therefore to be understood that within the scope of the appended claims, the invention may be practiced otherwise than as specifically described herein.

What is claimed as new and desired to be sercured by Letters Patent of the United States is:

1. An apparatus for extracting oxygen from an oxygen bearing liquid, comprising:
    a plurality of hollow cylindrical gills formed of gas permeable membranes;
    means for flowing through each of said gills a carrier fluid having dissolved therein a heme-like compound capable of absorbing and desorbing oxygen passign through said membranes,
    means for providing relative movement between said apparatus and a source of oxygen bearing liquid so as to form a moving stream of said liquid; and
    means for guiding said stream of liquid past said membranes in a flow direction, wherein an angle $\beta$ formed between said flow direction and the longitudinal axes of said gills is less than 90°, whereby the drag force of said apparatus is reduced;

wherein said means for guiding comprise a diffuser conduit having: an intake communicating with said source of liquid and having a first sectional area; a membrane supporting region in which said membranes are positioned, said membrane supporting region having a second sectional area larger than said first sectional area; and an outlet communicating with said source of liquid downstream from said membrane supporting region in said flow direction, said outlet having a third sectional area small than said second section area; and wherein said means for providing relative movement comprises means in said intake or outlet for propelling liquid within said intake in said flow direction, whereby drag losses are compensated for.

2. The apparatus of claim 1, wherein $\beta$ is less than 30°.

3. The apparatus of claim 1, wherein $\beta$ is substantially 25°.

4. The apparatus of claim 1, wherein said membranes are arranged in an annular plurality of rows, all of said rows comprising membranes aligned with one another in said flow direction.

5. The apparatus of claim 1, wherein said membrane supporting region comprises a plurality of concentric annular membrane supporting regions arranged in parallel and separated by concentric annular fluid flow guide elements, each of said plurality of membrane supporting regions independently communicating with said inlet and said outlet.

6. The apparatus of claim 1, including means for extracting said oxygen from said heme-like compound.

7. The apparatus of claim 6, positioned at the upstream end of an underwater vehicle in said flow direction.

8. The apparatus of claim 6 positioned at both the upstream and downstream ends of said underwater vehicle.

9. The apparatus of claim 8, wherein said vehicle includes vehicle propelling means.

* * * * *